(12) United States Patent
Bunker et al.

(10) Patent No.: US 9,003,657 B2
(45) Date of Patent: Apr. 14, 2015

(54) COMPONENTS WITH POROUS METAL COOLING AND METHODS OF MANUFACTURE

(71) Applicant: General Electric Company, Schenectady, NY (US)

(72) Inventors: Ronald Scott Bunker, Waterford, NY (US); Scott Andrew Weaver, Ballston Lake, NY (US); Wayne Charles Hasz, Pownal, VT (US)

(73) Assignee: General Electric Company, Niskayuna, NY (US)

( * ) Notice: Subject to any disclaimer, the term of this patent is extended or adjusted under 35 U.S.C. 154(b) by 336 days.

(21) Appl. No.: 13/718,256

(22) Filed: Dec. 18, 2012

(65) Prior Publication Data

US 2014/0169943 A1 Jun. 19, 2014

(51) Int. Cl.
| | |
|---|---|
| *B21D 53/78* | (2006.01) |
| *B21K 3/04* | (2006.01) |
| *B23P 15/02* | (2006.01) |
| *F02C 7/12* | (2006.01) |
| *C23C 4/02* | (2006.01) |
| *F01D 5/18* | (2006.01) |

(52) U.S. Cl.
CPC ... *F02C 7/12* (2013.01); *C23C 4/02* (2013.01); *B23P 2700/06* (2013.01); *F01D 5/183* (2013.01); *F05D 2260/203* (2013.01)

(58) Field of Classification Search
USPC ............. 29/889.7, 889.72, 889.721; 415/115, 415/116
See application file for complete search history.

(56) References Cited

U.S. PATENT DOCUMENTS

| | | | | |
|---|---|---|---|---|
| 2,641,439 | A | * 6/1953 | Williams | ..................... 416/90 R |
| 3,656,863 | A | 4/1972 | De Feo | |
| 4,487,550 | A | 12/1984 | Horvath et al. | |
| 4,594,761 | A | * 6/1986 | Murphy et al. | ............ 29/889.71 |
| 4,629,397 | A | 12/1986 | Schweitzer | |
| 4,893,987 | A | 1/1990 | Lee et al. | |
| 5,358,029 | A | * 10/1994 | Baveja et al. | ................. 164/516 |

(Continued)

FOREIGN PATENT DOCUMENTS

EP 1387040 B1 4/2004

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Richard Chang
(74) *Attorney, Agent, or Firm* — Ann M. Agosti

(57) ABSTRACT

A manufacturing method includes providing a substrate with an outer surface and at least one interior space and machining the substrate to selectively remove a portion of the substrate and define one or more cooling supply holes therein. Each of the one or more cooling supply holes is in fluid communication with the at least one interior space. The method further includes disposing an open cell porous metallic layer on at least a portion of the substrate. The open cell porous metallic layer is in fluid communication with the one or more cooling supply holes. A coating layer is disposed on the open cell porous metallic layer. The coating layer having formed therein one or more cooling exit holes in fluid communication with the open cell porous metallic layer. The substrate, the one or more cooling supply holes, the open cell porous metallic layer and the cooling exit holes providing a cooling network for a component.

20 Claims, 6 Drawing Sheets

(56) References Cited

U.S. PATENT DOCUMENTS

Figure 1:
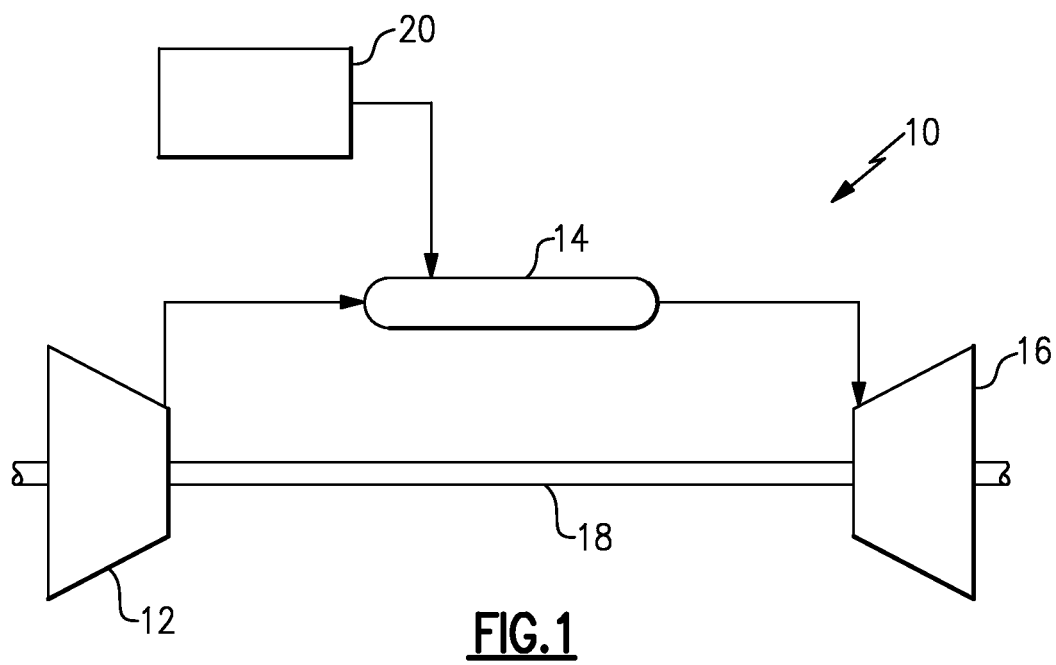

| | | | |
|---|---|---|---|
| 5,564,902 A | 10/1996 | Tomita | |
| 5,626,462 A | 5/1997 | Jackson et al. | |
| 5,640,767 A * | 6/1997 | Jackson et al. | 29/889.721 |
| 5,660,523 A | 8/1997 | Lee | |
| 5,820,337 A * | 10/1998 | Jackson et al. | 415/200 |
| 5,875,549 A | 3/1999 | McKinley | |
| 6,059,530 A | 5/2000 | Lee | |
| 6,086,328 A | 7/2000 | Lee | |
| 6,164,914 A | 12/2000 | Correia et al. | |
| 6,190,129 B1 | 2/2001 | Mayer et al. | |
| 6,214,248 B1 * | 4/2001 | Browning et al. | 216/56 |
| 6,231,307 B1 | 5/2001 | Correia | |
| 6,234,755 B1 | 5/2001 | Bunker et al. | |
| 6,321,449 B2 | 11/2001 | Zhao et al. | |
| 6,354,797 B1 * | 3/2002 | Heyward et al. | 415/191 |
| 6,368,060 B1 | 4/2002 | Fehrenbach et al. | |
| 6,383,602 B1 | 5/2002 | Fric et al. | |
| 6,405,435 B1 * | 6/2002 | Konter et al. | 29/889.7 |
| 6,412,541 B2 | 7/2002 | Roesler et al. | |
| 6,427,327 B1 * | 8/2002 | Bunker | 29/889.1 |
| 6,443,700 B1 | 9/2002 | Grylls et al. | |
| 6,551,061 B2 | 4/2003 | Darolia et al. | |
| 6,582,194 B1 | 6/2003 | Birkner et al. | |
| 6,602,053 B2 | 8/2003 | Subramanian et al. | |
| 6,612,811 B2 * | 9/2003 | Morgan et al. | 416/97 R |
| 6,617,003 B1 | 9/2003 | Lee et al. | |
| 6,905,302 B2 * | 6/2005 | Lee et al. | 415/115 |
| 6,921,014 B2 * | 7/2005 | Hasz et al. | 228/122.1 |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,216,428 B2 | 5/2007 | Memmen et al. | |
| 7,302,990 B2 | 12/2007 | Bunker et al. | |
| 7,334,333 B2 * | 2/2008 | Palazzini et al. | 29/889.721 |
| 7,744,348 B2 | 6/2010 | Bezencon et al. | |
| 7,766,617 B1 | 8/2010 | Liang | |
| 7,775,768 B2 | 8/2010 | Devore et al. | |
| 7,905,016 B2 | 3/2011 | James et al. | |
| 8,147,196 B2 | 4/2012 | Campbell et al. | |
| 8,153,923 B2 * | 4/2012 | Beck et al. | 219/121.2 |
| 8,533,949 B2 * | 9/2013 | Bunker | 29/889.721 |
| 2002/0141868 A1 | 10/2002 | Lee et al. | |
| 2002/0141869 A1 | 10/2002 | Lee et al. | |
| 2002/0182074 A1 | 12/2002 | Bunker | |
| 2002/0197160 A1 | 12/2002 | Liang | |
| 2003/0118444 A1 | 6/2003 | Lee et al. | |
| 2004/0096328 A1 | 5/2004 | Soechting et al. | |
| 2006/0153680 A1 | 7/2006 | Liang | |
| 2010/0080688 A1 | 4/2010 | Bezencon et al. | |

OTHER PUBLICATIONS

Wei et al., "Curved Electrode and Electrochemical Machining Method and Assembly Employing the Same," U.S. Appl. No. 12/562,528, filed Sep. 18, 2009.

Zhang et al., Process and System for Forming Shaped Air Holes, U.S. Appl. No. 12/697,005, filed Jan. 29, 2010.

Lacy et al., "Hot Gas Path Component Cooling System," U.S. Appl. No. 12/765,372, filed Apr. 22, 2010.

Lacy et a., "Articles Which Include Chevron Film Cooling Holes, And Related Processes," U.S. Appl. No. 12/790,675, filed May 28, 2010.

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.

Bunker et al., "Components With Re-Entrant Shaped Cooling Channels and Methods of Manufacture," U.S. Appl. No. 12/943,624, filed Nov. 10, 2010.

Bunker et al., "Component and Methods of Fabricating and Coating a Component," U.S. Appl. No. 12/943,646, filed Nov. 10, 2010.

Bunker et al., "Method of Fabricating a Component Using a Fugitive Coating," U.S. Appl. No. 12/943,563, filed Nov. 10, 2010.

Bunker et al., "Components With Cooling Channels and Methods of Manufacture," U.S. Appl. No. 12/965,083, filed Dec. 10, 2010.

Bunker et al., "Method of Fabricating a Component Using a Two-Layer Structural Coating," U.S. Appl. No. 12/996,101, filed Dec. 13, 2010.

Bunker et al., "Turbine Components With Cooling Features and Methods of Manufacturing the Same," U.S. Appl. No. 12/953,177, filed Nov. 23, 2010.

Bunker, "Components With Cooling Channels and Methods of Manufacture," U.S. Appl. No. 13/026,595, filed Feb. 14, 2011.

Rebak et al., "Methods of Fabricating a Coated Component Using Multiple Types of Fillers," U.S. Appl. No. 13/083,701, filed Apr. 11, 2011.

Bunker et al., "Components With Cooling Channels Formed in Coating and Methods of Manufacture", U.S. Appl. No. 13/052,415, filed Mar. 21, 2011.

Rebak et al., "Component and Methods of Fabricating a Coated Component Using Multiple Types of Fillers," U.S. Appl. No. 13/095,129, filed Apr. 27, 2011.

Bunker, "Components With Cooling Channels and Methods of Manufacture", U.S. Appl. No. 13/168,144, filed Jun. 24, 2011.

Bunker et al., "Components With Cooling Channels and Methods of Manufacture", U.S. Appl. No. 13/210,697, filed Aug. 16, 2011.

Bunker, "Repair Methods for Cooled Components", U.S. Appl. No. 13/267,617, filed Oct. 6, 2011.

Bunker et al., Components With Laser Cladding and Methods of Manufacture, U.S. Appl. No. 13/278,816, filed Oct. 21, 2011.

Bunker, "Components With Microchannel Cooling", U.S. Appl. No. 13/326,540, filed Dec. 15, 2011.

Bunker, "Components With Microchannel Cooling", U.S. Appl. No. 13/448,469, filed Apr. 17, 2012.

Bunker, "Components With Microchannel Cooled Platforms and Fillets and Methods of Manufacture", U.S. Appl. No. 13/478,517, filed May 23, 2012.

Bunker et al., "Components With Cooling Channels and Methods of Manufacture", U.S. Appl. No. 13/595,120, filed Aug. 27, 2012.

Bancheri et al., "Method for Removal of Cores From Niobium-Based Part", U.S. Appl. No. 11/276,002, filed Feb. 9, 2006.

Bunker "Micro-Channel Coating Deposition System and Method for Using the Same", U.S. Appl. No. 13/627,158, filed Sep. 26, 2012.

Bonini et al., "Methods of Forming Cooling Channels Using Backstrike Protection", U.S. Appl. No. 13/628,204, filed Sep. 27, 2012.

Bunker, "Method of Making Surface Cooling Channels on a Component Using Lithographic Molding Techniques", U.S. Appl. No. 13/650,320, filed Oct. 12, 2012.

Bunker et al., "Components With Micro Cooled Patterned Coating Layer and Methods of Manufacture", U.S. Appl. No. 13/663,989, filed Oct. 30, 2012.

Bunker et al., "Components With Micro Cooled Coating Layer and Methods of Manufacture",U.S. Appl. No. 13/663,967, filed Oct. 30, 2012.

Butler et al., "Components With Asymmetric Cooling Channels and Methods of Manufacture", U.S. Appl. No. 13/664,458, filed Oct. 31, 2012.

Bunker et al., "Components With Re-Entrant Shaped Cooling Channels and Methods of Manufacture", U.S. Appl. No. 13/669,922, filed Nov. 6, 2012.

Bohn, Prof. ING.D.E.; Technologies for the gas turbines of the next generation—results from the German Research Foundation, Special Research [Program] 561, Aachen Univ., 2006; 20 Pages.

* cited by examiner

COMPONENTS WITH POROUS METAL COOLING AND METHODS OF MANUFACTURE

BACKGROUND

The disclosure relates generally to gas turbine engines, and, more specifically, to cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve an acceptably long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. Transpiration cooling and micro-channels are considered two of the most effective methods of providing well distributed cooling in the outer layer of materials near the heat source. Transpiration cooling in the past has focused on making porous load bearing materials, which have typically been too weak for use in turbine technologies.

An example conventional cooled part includes a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. However, this cooling strategy typically results in comparatively inefficient heat transfer and non-uniform component temperature profiles. Micro-channel cooling provides fabrication of one or more grooves into the load bearing substrate material with a subsequent application of one or more coating layers to bridge the one or more grooves and define the micro-channels. In addition, in many instances, forming the microchannels in the load bearing substrate causes weakening of the substrate.

It would therefore be desirable to provide a method for cooling hot gas path components that provide for efficient heat transfer, uniform component temperature profiles, and reduced fabrication time.

BRIEF DESCRIPTION

One aspect of the present disclosure resides in a manufacturing method that includes providing a substrate with an outer surface and at least one interior space; machining the substrate to selectively remove a portion of the substrate and define one or more cooling supply holes therein, each of the one or more cooling supply holes in fluid communication with the at least one interior space; disposing an open cell porous metallic layer on the substrate, the open cell porous metallic layer in fluid communication with the one or more cooling supply holes; disposing a coating layer on the open cell porous metallic layer, the coating layer having formed therein one or more cooling exit holes in fluid communication with the open cell porous metallic layer. The substrate, the one or more cooling supply holes, the open cell porous metallic layer and the cooling exit holes provide a cooling network for a component.

Another aspect of the present disclosure resides in a manufacturing method that includes providing a substrate with an outer surface and at least one interior space, wherein the substrate comprises at least one of a Ni-base superalloy, a Co-base superalloy or a Fe-base superalloy; machining the substrate to selectively remove a portion of the substrate and define one or more cooling supply holes therein, each of the one or more cooling supply holes in fluid communication with the at least one interior space; disposing an open cell porous metallic layer on the substrate, the open cell porous metallic layer in fluid communication with the one or more cooling supply holes; disposing a coating layer on the open cell porous metallic layer, the coating layer having formed therein one or more cooling exit holes in fluid communication with the open cell porous metallic layer. The substrate, the one or more cooling supply holes, the open cell porous metallic layer and the cooling exit holes provide a cooling network for a component.

Yet another aspect of the present disclosure resides in a component that includes a substrate comprising an outer surface and an inner surface, wherein the inner surface defines at least one interior space; one or more cooling supply holes defined therein the substrate, each of the one or more cooling supply holes in fluid communication with the at least one interior space; an open cell porous metallic layer disposed on the substrate, the open cell porous metallic layer in fluid communication with the one or more cooling supply holes; a coating layer disposed on the open cell porous metallic layer, the coating layer having formed therein one or more cooling exit holes in fluid communication with the open cell porous metallic layer. The substrate, the one or more cooling supply holes, the open cell porous metallic layer and the cooling exit holes provide a cooling network for the component.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

Figure 2:
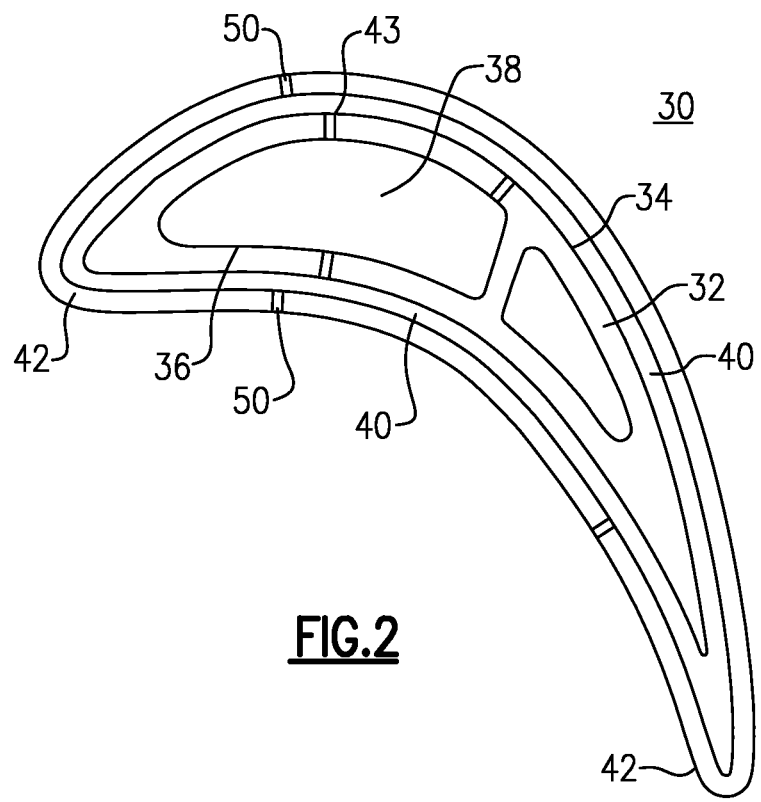
Figure 3:
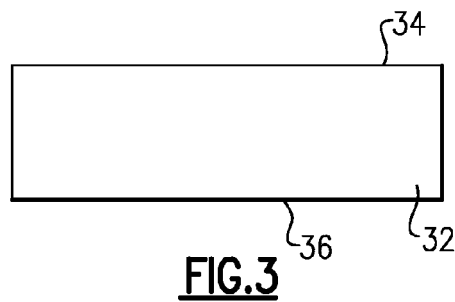
Figure 4:
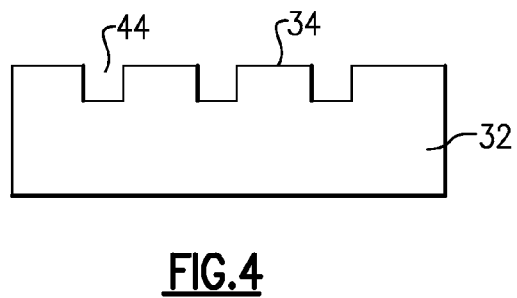
Figure 5:
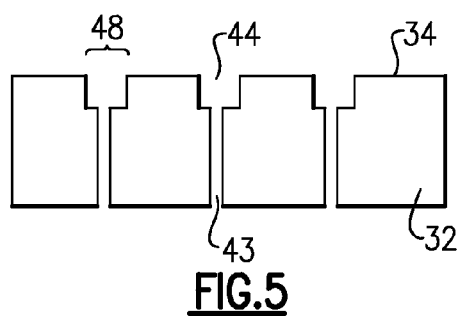
Figure 6:
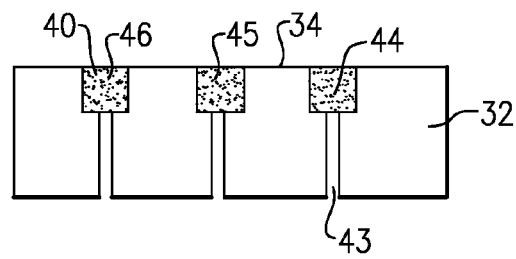
Figure 7:
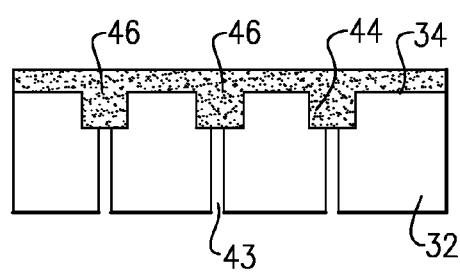
Figure 8:
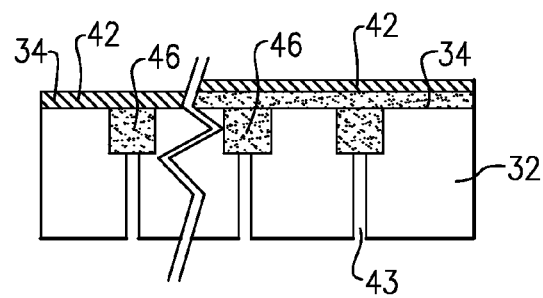
Figure 9:
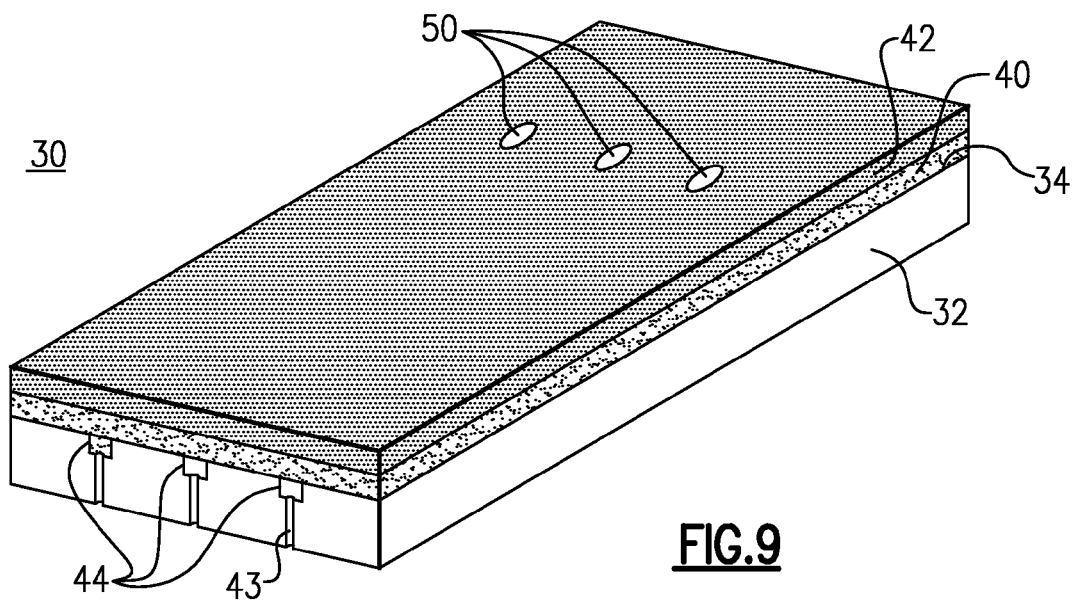
Figure 10:
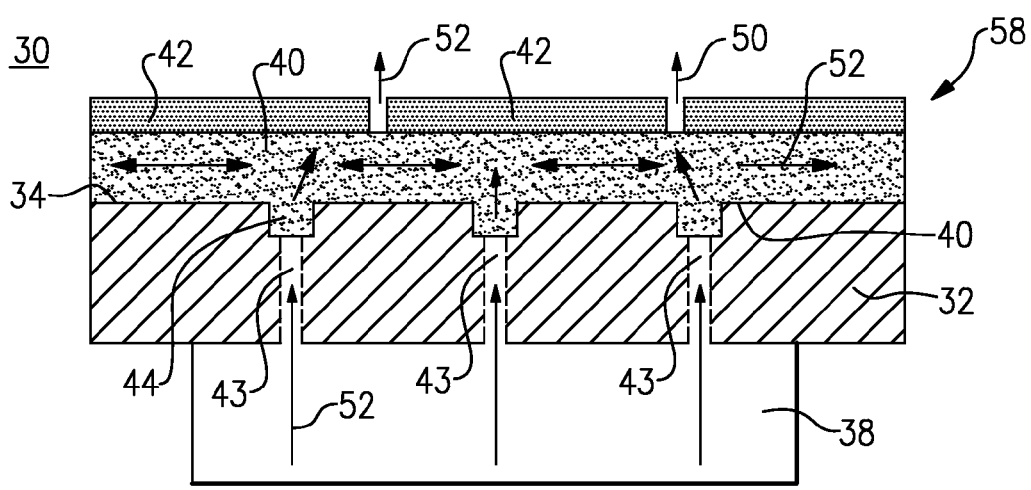
Figure 11:
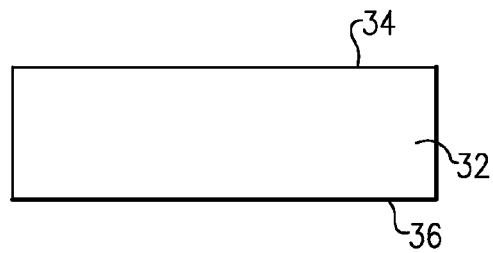
Figure 12:
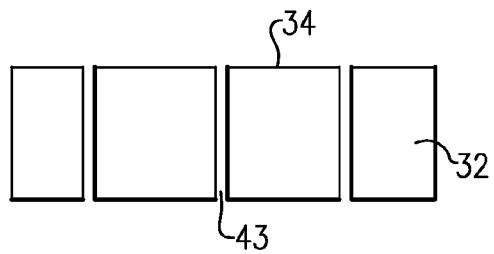
Figure 13:
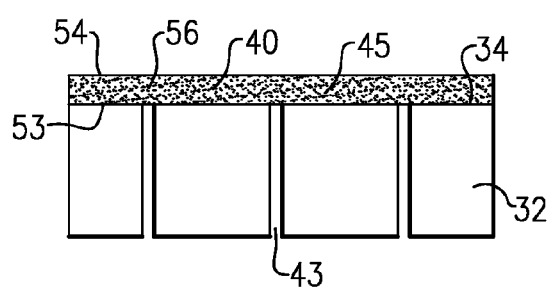
Figure 14:
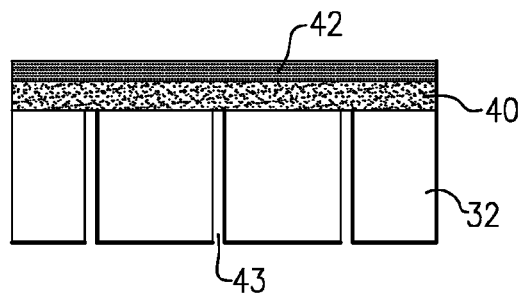
Figure 15:
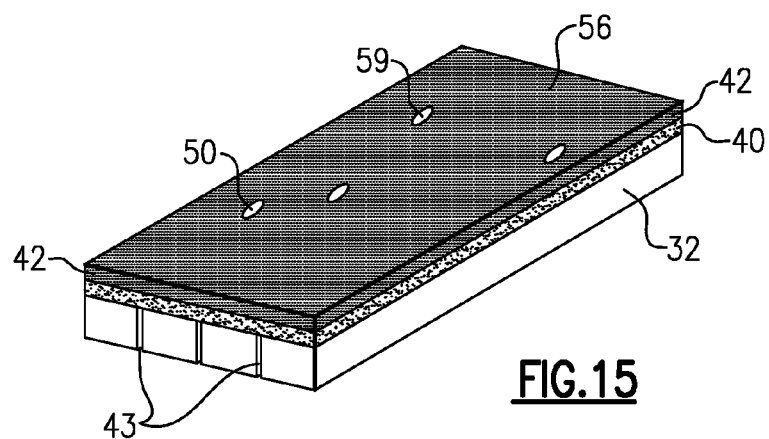
Figure 16:
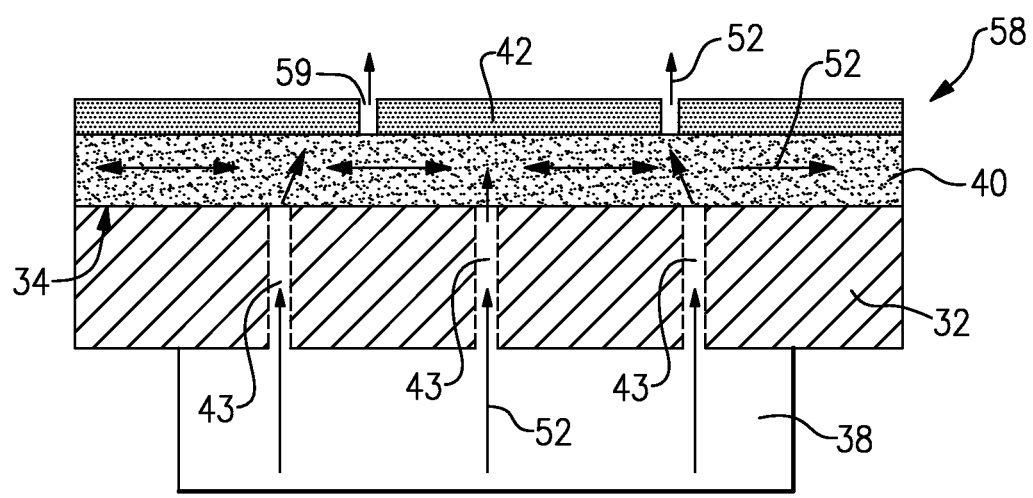
Figure 17:
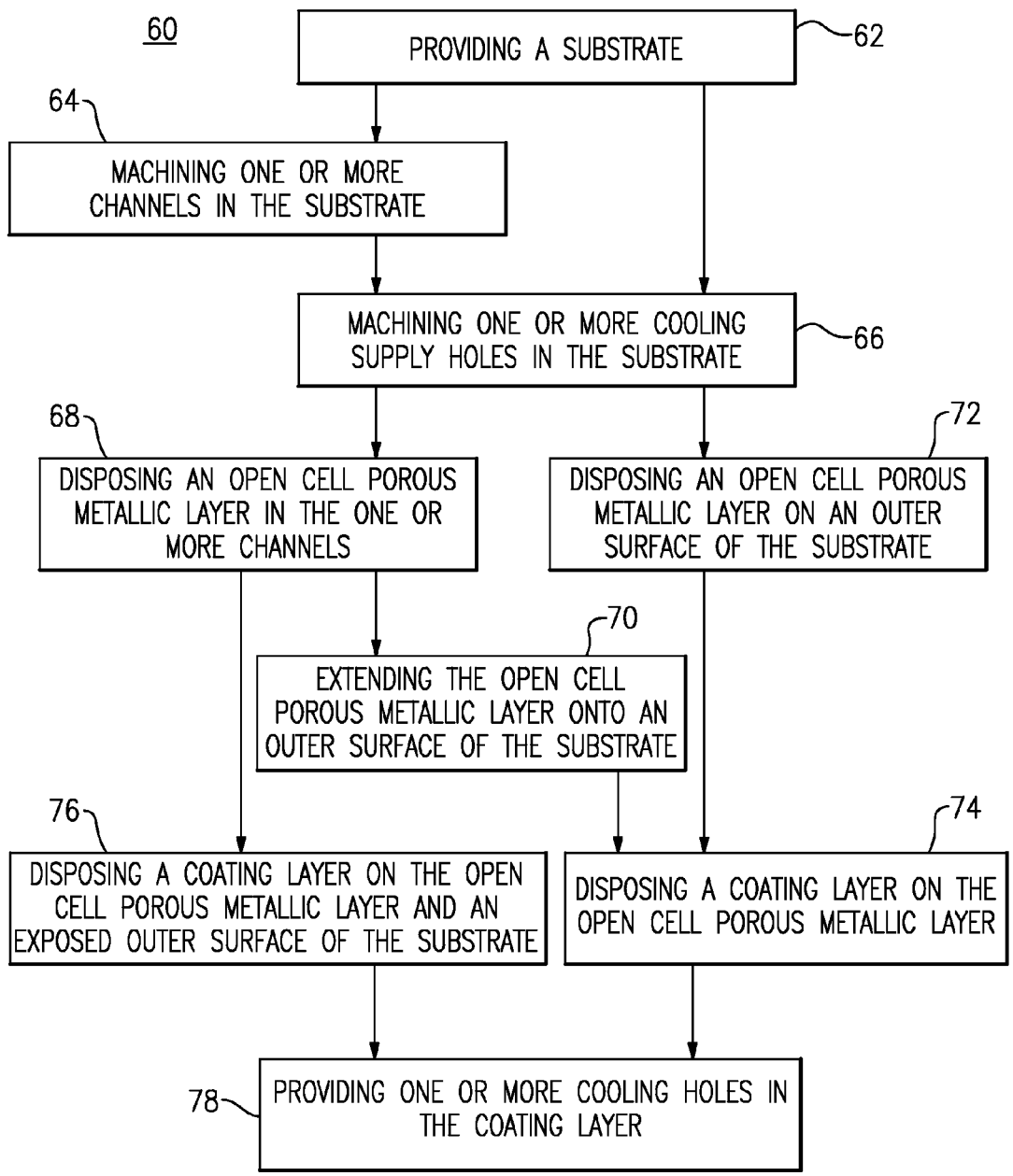

These and other features, aspects, and advantages of the present disclosure will become better understood when the following detailed description is read with reference to the accompanying drawings in which like characters represent like parts throughout the drawings, wherein:

FIG. 1 is a schematic illustration of a gas turbine system according to one or more embodiments shown or described herein FIG. 2 is a schematic cross-section of an example airfoil configuration including porous metal cooling, according to one or more embodiments shown or described herein;

FIG. 3 schematically depicts a step in a method disclosed herein including porous metal cooling according to one or more embodiments shown or described herein;

FIG. 4 schematically depicts a step in a method disclosed herein including porous metal cooling according to one or more embodiments shown or described herein;

FIG. 5 schematically depicts a step in a method disclosed herein including porous metal cooling according to one or more embodiments shown or described herein;

FIG. 6 schematically depicts a step in a method disclosed herein including porous metal cooling according to one or more embodiments shown or described herein;

FIG. 7 schematically depicts a step in a method disclosed herein including porous metal cooling according to one or more embodiments shown or described herein;

FIG. 8 schematically depicts a step in a method disclosed herein including porous metal cooling according to one or more embodiments shown or described herein;

FIG. 9 schematically depicts, in perspective view, three exemplary micro-channels that convey coolant via a porous metal layer to one or more film cooling exit holes according to one or more embodiments shown or described herein;

FIG. 10 is a cross-sectional view of the component of FIG. 9 with porous metal cooling according to one or more embodiments shown or described herein;

FIG. 11 schematically depicts a step in an alternate method disclosed herein including porous metal cooling according to one or more embodiments shown or described herein;

FIG. 12 schematically depicts a step in an alternate method disclosed herein including porous metal cooling according to one or more embodiments shown or described herein;

FIG. 13 schematically depicts a step in an alternate method disclosed herein including porous metal cooling according to one or more embodiments shown or described herein;

FIG. 14 schematically depicts a step in an alternate method disclosed herein including porous metal cooling according to one or more embodiments shown or described herein;

FIG. 15 schematically depicts, in perspective view, three example coolant supply holes that convey coolant via a porous metal layer to one or more film cooling exit holes according to one or more embodiments shown or described herein;

FIG. 16 is a cross-sectional view of the component of FIG. 15 with porous metal cooling according to one or more embodiments shown or described herein; and FIG. 17 is a flow chart depicting one implementation of a method of making a component including porous metal cooling according to one or more embodiments shown or described herein.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shafts 18. The shaft 18 may be a single shaft or multiple shaft segments coupled together to form shaft 18.

The gas turbine system 10 may include a number of hot gas path components. A hot gas path component is any component of the system 10 that is at least partially exposed to a flow of high temperature gas through the system 10. For example, bucket assemblies (also known as blades or blade assemblies), nozzle assemblies (also known as vanes or vane assemblies), shroud assemblies, transition pieces, retaining rings, and turbine exhaust components are all hot gas path components. However, it should be understood that the hot gas path component of the present disclosure is not limited to the above examples, but may be any component that is at least partially exposed to a flow of high temperature gas. Further, it should be understood that the hot gas path component of the present disclosure is not limited to components in gas turbine systems 10, but may be any piece of machinery or component thereof that may be exposed to high temperature flows.

When a hot gas path component is exposed to a hot gas flow, the hot gas path component is heated by the hot gas flow and may reach a temperature at which the hot gas path component is substantially degraded or fails. Thus, in order to allow system 10 to operate with hot gas flow at a high temperature, as required to achieve the desired efficiency, performance and/or life of the system 10, a cooling system for the hot gas path component is needed.

In general, the cooling system of the present disclosure includes an open cell porous metallic layer disposed on a substrate material forming the hot gas component. More specifically, the open cell porous metallic layer is deposited on or bonded to the substrate material (the load bearing material forming the hot gas path component). A protective coating layer is disposed on an uppermost surface of the open cell porous metallic layer of the hot gas path component, and in an embodiment, on any portion of the substrate not having the open cell porous metallic layer disposed thereon. The coating layer includes one or more exit holes formed therein. A cooling fluid may be provided to the open cell porous metallic layer from a plenum, via one or more supply holes. The cooling fluid may flow through the open cell porous metallic layer, cooling the hot gas path component.

Referring now to FIG. 2, illustrated is an example of a hot gas component 30 having an airfoil configuration. As indicated, the component 30 comprises a substrate 32 with an outer surface 34 and an inner surface 36. The inner surface 36 of the substrate 32 defines at least one hollow, interior space 38. In an alternate embodiment, in lieu of a hollow interior space, the hot gas component 30 may include a supply cavity. An open cell porous metallic layer 40 is disposed over at least a portion of the outer surface 34 of the substrate 32 as presently described. The open cell porous metallic layer 40 has an open cell format such that a cooling fluid can circulate through it both from interior to exterior and laterally between the substrate 32 and a coating layer 42 disposed thereon.

Defined within the substrate 32 are one or more cooling supply holes 43 in fluid communication with the at least one hollow, interior space 38. Each of the one or more cooling supply holes 43 is configured as a discrete opening and does not run the length of the substrate 32. In an embodiment, the substrate 32 may further include one or more channels (described presently) in fluid communication with the one or more cooling supply holes 43. Defined within the coating layer 42 are one or more cooling exit holes 50 in fluid communication with the open cell porous metallic layer 40.

As described below, the method disclosed herein includes techniques to create a three-dimensional finished component 30, and more particularly the airfoil, including an open cell porous metallic layer 40, having the coating layer 42 disposed thereon. The method may result in a component 30 that includes transpiration cooling without the prior fill/leaching processing problems and/or diminishing the strength of the underlying substrate 32. Re-entrant shaped cooling channels typically utilized to minimize deposition of the coating within the channel structure are not required, resulting in a decrease in machining time and relaxation of design tolerances. In addition, repair of the component 30 is easier, both in recovering mistakes on new part manufacture and in full repair.

As previously indicated, an exemplary embodiment fabricated according to the method disclosed herein is the fabrication of a gas turbine airfoil, including an interior hollow passageway in fluidic communication with an open cell porous metallic layer disposed on a surface of the airfoil substrate with a coating disposed on the open cell porous metallic layer.

Alternative methods of manufacture for the component 30 are described with reference to FIGS. 3-10 and FIGS. 11-16. In a first described embodiment, as illustrated in FIGS. 3-10, a first manufacturing method includes providing a substrate 32, and more particularly, providing a component, such as a cast airfoil component, as illustrated in FIG. 3. The substrate 32 provides structural support for the completed component 30. A plurality of channels 44, as illustrated in FIG. 4, may be provided in the substrate 32 by machining, and more specifically by selective material removal, such as through the use of an abrasive liquid jet. Other methods known in the art that may be used to form the plurality of channels 44 may include, but are not limited to, casting, electro-discharge machining, electro-chemical machining, and laser machining. Subsequent to, or simultaneous with, the fabrication of channels 44, the one or more cooling supply holes 43 may be formed in the substrate 32 as illustrated in FIG. 5. The one or more cooling supply holes 43 may be formed by machining, and more specifically by a drilling process, whereby each of the one or more cooling supply holes 43 is formed in fluid communication with each of the plurality of channels 44 and the interior space 38 (FIG. 2).

Referring now to FIG. 6, a porous metallic material 45 is disposed on the substrate 32. The porous metallic material 52 is disposed on the substrate 32 so as to form the open cell porous metallic layer 40. In this particular embodiment, the porous metallic material 45 is a metallic slurry 46, such as a metallic foam slurry, that is deposited within each of the one or more channels 44 formed in the substrate 32. The metallic slurry 46 is deposited so as to create the open cell porous metallic layer 40 having a desirable average open cell size. The porous metallic layer 40 is left within the channels 44 permanently. In an embodiment, the metallic slurry 46 may be comprised of a metallic foam material, such as nickel aluminide (NiAl) that is oxidation resistant.

In an embodiment, as best illustrated in FIG. 7, the metallic slurry 46 may be deposited so as to overfill the channels 44, and more particularly extend onto the outer surface 34 of the substrate 32, forming a substantially coating-like layer on the substrate 32. It should be understood that disposing the metallic slurry 46 so as to extend onto the outer surface 34 of the substrate 32 is optional. Fabrication of the open cell metallic layer 40 within the one or more channels 44 only, enables the greatest strength and durability to be obtained in light of subsequent bonding of portions of the coating layer 42 to the substrate 32. Alternatively, if the coating layer 42 (described presently) is able to penetrate the open cell metallic layer 40 that is formed outside of the channels 44 and on the outer surface 34 of the substrate 32, as illustrated in FIG. 8, such that it fills all or substantially all of the cells within that portion of the open cell metallic layer 40, and additionally bonds to the substrate 32, any processing details associated with precision filling of the one or more channels 44 can be alleviated. In an attempt to achieve such goal, the portion of the open cell metallic layer 40 extending beyond the channels 44 and onto the outer surface 34 of the substrate 32 can be formed sufficiently thin to facilitate such objective Next, as illustrated in FIG. 8, in a split diagram, the open cell porous metallic layer 40 having been deposited within the channels 44, and if present on the outer surface 34 of the substrate 32 (as depicted in a right-hand portion of the split diagram), is coated with the coating layer 42, also referred to herein as a structural coating or cover coating. The coating layer 42 is deposited via a means for achieving deposition on the open cell porous metallic layer 40, and if exposed, on the outer surface 34 of the substrate 32 (as depicted in a left-hand portion of the split diagram). In an embodiment, the deposition of the coating layer 42 may be accomplished by employing a thermal spray process, ion plasma deposition process, or similar processing technique. During the process of depositing the coating layer 42, the coating layer 42 provides bridging of the cells closest to the outer surface of the open cell porous metallic layer 40 in the open cell porous metallic layer 40. More particularly, the size of the cells in the open cell porous metallic layer 40 are configured sufficiently small, so as to allow the coating layer 42 to bridge the cells, forming a sealing protective-like layer for the component 30. The ability of the coating layer 42 to bridge the cells in the open cell porous metallic layer 40 eliminates the need for re-entrant shaped channels to be formed during the manufacturing process. In addition, the bridging of the cells allows the one or more channels 44 to be formed having a much wider opening 48, as illustrated in FIG. 5, than previously known channels and provide ease of processing. The cell size and solidity of the open cell metallic layer 40 provides additional strength to the completed component 30.

The ability to bridge the cells in the open cell metallic layer 40 in a direct coating step, provides for the micro-cooling channels 44 to be configured wider than previously known channels, and eliminates the need for small openings. The channels 44 can be formed shallow, yet much wider, and of a simply machined open format (no re-entrant shaping). The average cell size within the open cell porous metallic layer 40 is sufficiently small to ensure the direct coating bridging process. In an instance whereby some of the coating material that forms the coating layer 42 infiltrates the open cell metallic layer 40, the bridging and shadowing effects will keep it from infiltrating very far into the metallic layer 40.

In the described embodiment, the method allows the width and spacing of the channels 44 to be varied to increase a surface area for anchoring the porous metal, and more particularly, the open cell metallic layer 40, as required.

For particular configurations, the coating layer 42 has a thickness in the range of 0.1-2.0 millimeters, and more particularly, in the range of 0.2 to 1 millimeter, and still more particularly 0.2 to 0.5 millimeters for industrial components. For aviation components, this range is typically 0.1 to 0.25 millimeters. However, other thicknesses may be utilized depending on the requirements for a particular component 30. In an embodiment, the coating material 42 is deposited having a thickness of approximately 0.25 millimeters. In an embodiment, subsequent to deposition, the coating material 42 is heat treated.

In a final processing step, and as best illustrated in FIGS. 9 and 10, the one or more cooling exit holes 50 are machined in the coating layer 42. The one or more cooling exit holes 50 are machined in any locations and pattern in the coating layer 42 to provide fluid communication with the cooling pattern. After processing, provided is the component 30 having provided a cooling network 58 comprising the interior space passageway 38, the one or more cooling supply holes 43 in fluid communication with the interior passageway 38, one or more cooling channels 44 in fluid communication with the cooling supply holes 43, an open cell porous metallic layer 40 in fluid communication with the cooling channels 44, and one or more cooling exit holes 50 formed in the coating layer 42 and in fluid communication with the open cell porous metallic layer 40. It should be understood that the cooling exit holes 50 can take on many alternate forms.

During operation, as illustrated in FIG. 10, a cooling fluid 52 flows as indicated by the directional arrows from the interior space 38 toward the cooling exit holes 50. As the cooling fluid 52 flows within the open cell porous metallic layer 40, micro-channel cooling is provided to the substrate 32, and more particularly to the component 30. As indicated, the component 30, formed according to the above-disclosed manufacturing process, allows the width and spacing of the channels 44 to be varied so as to increase the surface area for anchoring the open cell porous metallic layer 40. Furthermore, the provision of a porous layer, and more particularly the open cell porous metallic layer 40, between the substrate 32 and the coating layer 42 allows a coolant, and more particularly the coolant fluid 52, to fully spread out under the coating layer 42.

Several alternate embodiments, such as combining the above-described manufacture process with known re-entrant shaping of the one or more channels is anticipated by this disclosure. In addition, applying two or more varying types of metallic slurries to form the open cell porous metallic layer 40 is anticipated by this disclosure. More specifically, in an alternate embodiment, a first metallic slurry being of a more open cell or porous type may be used to fill the one or more channels 44, followed by a denser version of the metallic slurry to act as a channel cap. While specific embodiments have been described herein, it should be understood that any combination of the above configurations is anticipated by the disclosure.

As shown in an embodiment illustrated in FIGS. 11-16, an alternative method of manufacture for the component 30 is described. It should be understood that like elements have like numbers throughout the embodiments. As illustrated in FIG. 11, a first manufacturing step includes providing a substrate 32 having an inner surface 36 and an outer surface 34, and more particularly, providing a component, such as a cast airfoil component. Similar to the first embodiment, a plurality of cooling supply holes 43, as illustrated in FIG. 12, may be provided in the substrate 32. The one or more cooling supply holes 43 may be formed by machining, and more particularly by selective etching or drilling, such as through the use of an abrasive liquid jet, whereby each of the one or more cooling supply holes 43 is formed in fluid communication with the interior space 38 (FIG. 2). In this particular embodiment, each of the one or more cooling supply holes 43 extends from an inner surface 36 of the substrate 32 to an outer surface 34 of the substrate 32. It should be noted that the described method, including the fabrication of the one or more coolant supply holes 43 without the inclusion of channels as in the previously described embodiment, provides for one less processing step during manufacture. Yet, in an alternate embodiment, a plurality of channels (not shown), generally similar to channels 44 of FIGS. 3-10, may be included.

Referring now to FIG. 13, the porous metallic material 45 is disposed on the outer surface 34 of the substrate 32. The porous metallic material 45 is disposed on the substrate 32, and more particularly bonded to the substrate 32, so as to form the open cell porous metallic layer 40 having a predetermined desirable random open cell size. In this particular embodiment, the porous metallic material 45 may be comprised of a preformed porous material 56 that is bonded onto the outer surface 34 of the substrate 32 as a thin layer during a processing step. Such bonding processes may include, but are not limited to, brazing, diffusion bonding, sintering, or the like. In an embodiment, the preformed porous material 56 may be comprised of a plurality of metallic particles that at least partially melt to adhere to one another during a sintering process and form the open cell porous metallic layer 40. In an alternate embodiment, the preformed porous material 56 may be comprised of a metallic powder bed where larger metallic particles are coated with a thin coating of brazing, such that during brazing, the large particles are fused together thereby forming an open cell porous metallic layer 40. In yet another embodiment, the porous metallic material 52 may be comprised of a preformed porous material layer that is brazed onto the outer surface 34 of the substrate 32. The composition of the braze, and more particularly a braze alloy, is preferably similar to that of the substrate. For example, if the substrate is a nickel-based super-alloy, the braze alloy can contain a similar nickel-based super-alloy composition. In the alternative, nickel-based braze alloys or cobalt-based braze alloys are usually used with cobalt-based super-alloys. Nickel- or cobalt-based compositions generally denote compositions wherein nickel or cobalt is the single greatest element in the composition. The braze alloy composition may also contain silicon, boron, phosphorous or combinations thereof, which serve as melting point suppressants. It is noted that other types of braze alloys can be used, such as precious metal compositions containing silver, gold, or palladium, mixtures thereof, in combination with other metals, such as copper, manganese, nickel, chrome, silicon, and boron. Mixtures that include at least one of the braze alloy elements are also possible. Exemplary braze alloys include by weight percent, 2.9 boron, 92.6 nickel, 4.5 tin; 3.0 boron, 7.0 chromium, 3.0 iron, 83.0 nickel, and 4.0 silicon; 19.0 chromium, 71.0 nickel, and 10.0 silicon; 1.8 boron, 94.7 nickel, and 3.5 silicon. In an embodiment, the porous metallic material 45 is a nickel containing alloy that is oxidation resistant, such as, but not limited to Ni, NiCrAlY, NiAl, etc. In one particular embodiment, the porous metallic material 45 is comprised of a nickel foam that is brazed to a superalloy using a NiCrSiB braze, although anticipated is the use of any brazing material that will provide bonding of the materials and have good oxidation resistance.

The porous metallic material 45 comprises an open cell format such that a cooling fluid (described presently) can circulate through it both from a first side 53 to a second side 55 and laterally between the substrate 32 and a coating layer (described presently). In this particular embodiment, the distribution of cell sizes in the open cell porous metallic layer 40 should be in a range of about 0.0125 millimeters to about 0.25 millimeters. The smaller size cells will determine the coolant pressure loss limit, and the larger size cells will dictate the covering capability of the coating layer disposed thereon. The open cell porous metallic layer 40 is not a load bearing structure.

In an embodiment, best illustrated in FIG. 14, the open cell porous metallic layer 40 having been disposed on the outer surface 34 of the substrate 32 is coated with the coating layer 42, also referred to herein, and as previously noted, as a structural coating or cover coating. The coating layer 42 is deposited via a means for achieving deposition, on the open cell porous metallic layer 40. In an embodiment, the deposition of the coating layer 42 is accomplished by employing a thermal spray process, ion plasma deposition process, or similar processing technique. During the process of depositing the coating layer 42, and in contrast to the first disclosed embodiment, the coating layer 42, in combination with the open cell porous metallic layer 40, is cell size deliberately controlled to prevent complete sealing over of the open cell porous metallic layer 40. More particularly, a predetermined percentage of the cells in the open cell porous metallic layer 40 are configured of sufficient size, to prevent the coating layer 42 from bridging the cells, thereby forming a random distribution of cells in the open cell porous metallic layer 40 that are not sealed. More particularly, the coating layer 42, disposed over the open cell porous metallic layer 40, seals a substantial portion of the second side 55, and more specifically, an outer surface of the open cell porous metallic layer 40 while leaving a lesser number of randomly distributed holes for coolant exit where the porosity of the open cell porous metallic layer 40 is too large to completely seal. These unsealed cells and resultant openings in the coating layer 42, provide one or more cooling exit holes 59 in the coating layer 42 for a cooling fluid (described presently) to pass therethrough. In contrast to the previous embodiment, when the coating layer 42 is applied, the deposition will bridge over most of the top surface cells in the open cell porous metallic layer 40 of sizes below about 0.125 millimeters and leave various sized openings (holes) over those cells greater in size. The open cell porous metallic layer 40 being a random distribution of cell sizes, this will result in a random distribution of the coolant exit holes 59 over an outer surface 56 of the coating layer 42. Desirably this manufacturing process does not disturb the cast substrate 32 beyond fabrication of the conventional coolant supply holes 43. The coating layer 42 is not a load bearing structure.

The resulting distribution of coolant exit holes 59 through the coating layer 42 will have both a spatial distribution as well as a size distribution. Since the open cell porous metallic layer 40 cell sizes vary, the resulting sizes of the non-bridged cells will also vary. While ion plasma deposition of the coating layer 42 may be used to accommodate smaller cell sizes formed in the open cell porous metallic layer 40, if the cell size range or distribution is increased to larger sizes, then a coating layer 42 deposited using a thermal plasma spray will also produce similar results. Final results will depend on the powder sizes used for the thermal sprays as well as other process specifications (e.g. HVOF, HVAF, VPS, cold spray). In either case, there will be some penetration depth of the coating layer 42 into the cells in the open cell porous metallic layer 40, and hence it is important that the thickness of the open cell porous metallic layer 40 be sufficient to allow sufficient circulation and distribution of the cooling fluid 52 therein. In an embodiment, the thickness of the open cell porous metallic layer 40 should be between 0.125 millimeters and as much as 0.50 millimeters, with some dependence on the material ligament strength and density (number of ligaments per square millimeter).

After processing, and as best illustrated in FIGS. 15 and 17, provided is the component 30 having provided a cooling network 58 comprising interior space passageway 38, the one or more cooling supply holes 43 in fluid communication with the interior passageway 38, an open cell porous metallic layer 40 in fluid communication with the one or more cooling supply holes 43, and one or more cooling exit holes 40 formed in the coating layer 42 and in fluid communication with the open cell porous metallic layer 40.

As best illustrated in FIG. 16, the one or more cooling supply holes 43 connect the open cell porous metallic layer 40 to the interior space 38. As shown in FIG. 2, the substrate 32 has at least one interior space 38 (FIG. 2). As in the previous embodiment, it should be noted that the cooling supply holes 43, are discrete holes located in the cross-section shown and do not extend through the substrate 32 along the length of the substrate 32. The cooling supply holes 43 may be machined anywhere and in any desired pattern connecting the open cell porous metallic layer 40 to the interior space 38. The cooling supply holes 43 may be formed at normal angle relevant to the local surface, such as the outer surface 34 of the substrate 32, as illustrated or at an acute angle to the local surface, such as the outer surface 34 of the substrate 32.

The substrate 32 is typically a cast structure, as discussed in U.S. Pat. No. 5,626,462, Melvin R. Jackson et al., "Double-wall airfoil," which is incorporated herein in its entirety. The substrate 32 may be formed from any suitable material. Depending on the intended application for component 30, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high-temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and/or $Mo_3Si$ second phases. For other configurations, the substrate material comprises a ceramic matrix composite (CMC), such as a silicon carbide (SiC) matrix reinforced with SiC fibers. For other configurations the substrate material comprises a TiAl-based intermetallic compound.

The coating layer 42 may be applied or deposited using a variety of techniques as described with the respective embodiments. In an embodiment, the coating layer 42 may be deposited by performing ion plasma deposition (also known in the art as cathodic arc deposition). Example ion plasma deposition apparatus and method are provided in commonly assigned, U.S. Pat. No. 7,879,203, Weaver et al., "Method and Apparatus for Cathodic Arc Ion Plasma Deposition," which is incorporated by reference herein in its entirety. Briefly, with regard to the present disclosure, ion plasma deposition comprises placing a consumable cathode having a composition to produce the desired coating material within a vacuum chamber, providing the substrate 32, having the open cell porous metallic layer 40 disposed thereon, supplying a current to the cathode to form a cathodic arc upon a cathode surface resulting in arc-induced erosion of coating material from the cathode surface, and depositing the coating material from the cathode upon the open cell porous metallic layer 40.

Non-limiting examples of a coating deposited using ion plasma deposition are described in U.S. Pat. No. 5,626,462. For certain hot gas path components, the coating comprises a nickel-based or cobalt-based alloy, and more particularly comprises a superalloy or a (Ni,Co)CrAlY alloy. Where the substrate material is a Ni-base superalloy containing both γ and γ' phases, coating may comprise similar compositions of materials, as discussed in U.S. Pat. No. 5,626,462. Additionally, for superalloys the coating may comprise compositions based on the γ'-$Ni_3Al$ family of alloys.

For other process configurations, the coating layer 42 is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni,Co)CrAlY coating is selectively deposited by HVOF or HVAF. Other example techniques for selectively depositing the coating layer 42 include, without limitation, sputtering, electron beam physical vapor deposition, entrapment plating, and electroplating.

In yet other process configurations, the coating layer 42 is bonded to the outer surface 34 of the substrate 32 using a brazing process, or other bonding process capable of metallurgically bonding the coating layer 42 to the substrate 32.

As indicated, with regard to FIGS. 4, 5, and 12, the one or more channels 44 and coolant supply holes 43 may be defined using a variety of techniques. Example techniques for defining the one or more channels 44 and coolant supply holes 43 include an abrasive liquid jet, plunge electrochemical machining (ECM), electric discharge machining (EDM) with a spinning electrode (milling EDM), laser machining and/or drilling. Example laser machining techniques are described in commonly assigned, U.S. Publication No. 2011/0185572, B. Wei et al., "Process and System for Forming Shaped Air Holes", which is incorporated by reference herein in its entirety. Example EDM techniques are described in commonly assigned U.S. Patent Publication No. 2011/0293423, R. Bunker et al., "Articles Which Include Chevron Film Cooling Holes and Related Processes," which is incorporated by reference herein in its entirety.

For particular processes, the one or more channels 44 and coolant supply holes 43 may be formed using an abrasive liquid jet. Example abrasive liquid jet drilling processes and systems are additionally provided in U.S. Publication No. 2011/0293423. As explained in U.S. Publication No. 2011/0293423, the abrasive liquid jet process typically utilizes a high-velocity stream of abrasive particles (e.g., abrasive "grit"), suspended in a stream of high pressure water. The pressure of the liquid may vary considerably, but is often in the range of about 35-620 MPa. A number of abrasive materials can be used, such as garnet, aluminum oxide, silicon carbide, and glass beads. Beneficially, the capability of abrasive liquid jet machining techniques facilitates the removal of material in stages to varying depths and with control over the shape of the machined features. This allows the one or more interior cooling supply holes 43 that supply the cooling fluid 52 to be drilled either as a straight hole of constant cross section, a shaped hole (e.g., elliptical), or a converging or diverging hole (not shown).

In addition, and as explained in U.S. Publication No. 2011/0293423, the water jet system may include a multi-axis computer numerically controlled (CNC) unit (not shown). The CNC systems themselves are known in the art, and described, for example, in U.S. Pat. No. 7,351,290, S. Rutkowski et al., "Robotic Pen", which is incorporated herein by reference in its entirety. CNC systems allow movement of the cutting tool along a number of X, Y, and Z axes, as well as the tilt axes.

Referring now to FIG. 17, illustrated is a flow chart depicting one implementation of a method 60 of making a component 30, including an open cell porous metallic layer 40, according to one or more embodiments shown or described herein. The method 60 includes manufacturing the component 30 by initially providing a substrate 32, at step 62. In an optional machining step 64, the one or more channels 44 are next defined in the substrate 32. Next, at step 66, the substrate 32 is machined to selectively remove portions of the substrate 32 and define at least one or more cooling supply holes 42. The one or more cooling supply holes 43 are provided in fluidic communication with the interior space 38. The open cell porous metallic layer 40 is next disposed on the substrate 32. In an embodiment including the one or more channels 44, the open cell porous metallic layer 40 is disposed solely within the one or more channels 44 defined therein the substrate 32, as shown at step 68. In another embodiment including the one or more channels 44, the open cell porous metallic layer 40 is disposed within the one or more channels 44 defined therein the substrate 32 and extends onto the outer surface 34 of the substrate 32 so as to dispose the open cell porous metallic layer 40 within the channels 44 and on the outer surface 34 of the substrate 32, as shown at step 70. In yet another embodiment, wherein only the one or more coolant supply holes 42 are formed in the substrate 32, the open cell porous metallic layer 40 is disposed solely on the outer surface 34 of the substrate 32, as shown at step 72. To complete the component 30, a coating layer 42 is disposed on at least the open cell porous metallic layer 40, as shown in step 74, and in contact with any exposed outer surface 34 of the substrate 32, as shown in step 76. Finally, in a step 78, one or more cooling exit holes 50, 59 are provided in the coating layer 42, either formed due to lack of bridging by the coating layer 42 of the cells defined in the open cell porous metallic layer 40 or by machining when complete bridging by the coating layer 42 of the cells in the open cell porous metallic layer 40 has taken place. After processing, provided is the component 30 including the interior space passageway 38, the one or more cooling supply holes 43 in fluidic communication with the interior passageway 38, the open cell porous metallic layer 40 in fluid communication with the one or more cooling supply holes 43 and the coating layer 42 having the one or more cooling exit holes 50, 59 in fluid communication with the open cell porous metallic layer. The one or more cooling supply holes 43, the open cell porous metallic layer 40, the coating layer 42, and the one or more cooling exit holes 50, 59 providing cooling to the component 30.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A manufacturing method comprising:
providing a substrate with an outer surface and at least one interior space;
machining the substrate to selectively remove a portion of the substrate and define one or more cooling supply holes therein, each of the one or more cooling supply holes in fluid communication with the at least one interior space;
disposing an open cell porous metallic layer on at least a portion of the substrate, the open cell porous metallic layer in fluid communication with the one or more cooling supply holes; and
disposing a coating layer on the open cell porous metallic layer, the coating layer having formed therein one or more cooling exit holes in fluid communication with the open cell porous metallic layer,
wherein the substrate, the one or more cooling supply holes, the open cell porous metallic layer and the cooling exit holes provide a cooling network for a component.

2. The manufacturing method of claim 1, wherein the substrate comprises at least one of a Ni-base superalloy, a Co-base superalloy or a Fe-base superalloy.

3. The manufacturing method of claim 2, wherein the open cell porous metallic layer comprises a metallic slurry.

4. The manufacturing method of claim 3, further including machining the substrate to selectively remove a portion of the substrate to define one or more channels therein, each of the one or more channels in fluid communication with the one or more cooling supply holes.

5. The manufacturing method of claim 4, wherein disposing the open cell porous metallic layer on at least a portion of the substrate comprises selectively depositing the open cell porous metallic layer within the one or more channels defined in the substrate.

6. The manufacturing method of claim 5, further comprising depositing the coating layer on the outer surface of the substrate.

7. The manufacturing method of claim 5, wherein disposing the open cell porous metallic layer on at least a portion of the substrate further comprises selectively depositing the open cell porous metallic layer to extend onto the outer surface of the substrate.

8. The manufacturing method of claim 3, further including machining the coating layer to selectively remove a portion of the coating layer and define the one or more cooling exit holes.

9. The manufacturing method of claim 8, wherein machining the coating layer includes drilling.

10. The manufacturing method of claim 2, wherein the open cell porous metallic layer comprises a preformed porous metallic layer having a plurality of controlled cell sizes defined therein to enable random bridging of the of the cells by the coating layer to define therein the one or more cooling exit holes in fluid communication with the open cell porous metallic layer.

11. The manufacturing method of claim 10, wherein disposing the open cell porous metallic layer on the substrate comprises bonding the preformed porous metallic layer to an outer surface of the substrate.

12. The manufacturing method of claim 1, wherein the step of machining includes using one or more of an abrasive liquid jet, plunge electrochemical machining (ECM), electric discharge machining (EDM) with a spinning electrode (milling EDM), and laser machining.

13. A manufacturing method comprising:
providing a substrate with an outer surface and at least one interior space, wherein the substrate comprises at least one of a Ni-base superalloy, a Co-base superalloy or a Fe-base superalloy;
machining the substrate to selectively remove a portion of the substrate and define one or more cooling supply holes therein, each of the one or more cooling supply holes in fluid communication with the at least one interior space;
disposing an open cell porous metallic layer on at least a portion of the substrate, the open cell porous metallic layer in fluid communication with the one or more cooling supply holes; and
disposing a coating layer on the open cell porous metallic layer, the coating layer having formed therein one or more cooling exit holes in fluid communication with the open cell porous metallic layer,
wherein the substrate, the one or more cooling supply holes, the open cell porous metallic layer and the cooling exit holes provide a cooling network for a component.

14. The manufacturing method of claim 13, wherein a thickness of the open cell metallic layer is in a range of about 0.125 millimeters to about 0.50 millimeters.

15. The manufacturing method of claim 13, wherein a thickness of the coating layer is in a range of about 0.10 millimeters to about 1.0 millimeters.

16. The manufacturing method of claim 13, wherein disposing an open cell porous metallic layer on at least a portion of the substrate comprises selectively depositing a metallic slurry on the substrate.

17. The manufacturing method of claim 13, wherein disposing an open cell porous metallic layer on at least a portion of the substrate comprises bonding a preformed porous metallic layer having controlled cell sizes therein to the substrate.

18. A component comprising:
a substrate comprising an outer surface and an inner surface, wherein the inner surface defines at least one interior space;
one or more cooling supply holes defined therein the substrate, each of the one or more cooling supply holes in fluid communication with the at least one interior space;
an open cell porous metallic layer disposed on at least a portion of the substrate, the open cell porous metallic layer in fluid communication with the one or more cooling supply holes; and
a coating layer disposed on the open cell porous metallic layer, the coating layer having formed therein one or more cooling exit holes in fluid communication with the open cell porous metallic layer,
wherein the substrate, the one or more cooling supply holes, the open cell porous metallic layer and the cooling exit holes provide a cooling network for the component.

19. The component of claim 18, wherein the open cell porous metallic layer is comprised of a metallic slurry.

20. The component of claim 18, wherein the open cell porous metallic layer is comprised of a preformed porous metallic layer bonded to the substrate and having a plurality of controlled cell sizes therein.

\* \* \* \* \*

UNITED STATES PATENT AND TRADEMARK OFFICE
CERTIFICATE OF CORRECTION

PATENT NO. : 9,003,657 B2  
APPLICATION NO. : 13/718256  
DATED : April 14, 2015  
INVENTOR(S) : Bunker et al.

It is certified that error appears in the above-identified patent and that said Letters Patent is hereby corrected as shown below:

Specification

In Column 5, Line 67, delete "porous metallic material 52" and insert -- porous metallic material 45 --, therefor.

In Column 8, Line 45, delete "porous metallic material 52" and insert -- porous metallic material 45 --, therefor.

In Column 9, Line 56, delete "outer surface 56" and insert -- outer surface 34 --, therefor.

In Column 10, Line 22, delete "exit holes 40" and insert -- exit holes 59 --, therefor.

Claims

In Column 14, Line 1, in Claim 10, delete "of the of the cells" and insert -- of the cells --, therefor.

Signed and Sealed this  
Sixth Day of October, 2015

Michelle K. Lee  
*Director of the United States Patent and Trademark Office*